United States Patent
Yoshihashi et al.

(10) Patent No.: US 8,035,531 B2
(45) Date of Patent: Oct. 11, 2011

(54) PARKING SUPPORT DEVICE

(75) Inventors: Akio Yoshihashi, Toyota (JP); Yuuichi Kubota, Okazaki (JP); Tomohiko Endo, Toyota (JP); Yukiko Kawabata, Toyota (JP); Takashi Nonoyama, Toyota (JP); Takashi Ohira, Toyota (JP); Keisuke Ikari, Toyota (JP); Yasushi Makino, Mishima (JP); Takuya Ito, Kuwana (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 295 days.

(21) Appl. No.: 12/092,095

(22) PCT Filed: Oct. 24, 2006

(86) PCT No.: PCT/JP2006/321166
§ 371 (c)(1),
(2), (4) Date: Apr. 30, 2008

(87) PCT Pub. No.: WO2007/052496
PCT Pub. Date: May 10, 2007

(65) Prior Publication Data
US 2009/0251334 A1    Oct. 8, 2009

(30) Foreign Application Priority Data

Oct. 31, 2005  (JP) ................................. 2005-316921
Oct. 31, 2005  (JP) ................................. 2005-317579

(51) Int. Cl.
*G08G 1/14*    (2006.01)
(52) U.S. Cl. .......................... 340/932.2; 701/23; 701/28
(58) Field of Classification Search ................ 340/932.2
See application file for complete search history.

(56) References Cited

U.S. PATENT DOCUMENTS

| | | | | |
|---|---|---|---|---|
| 6,567,726 B2 * | 5/2003 | Sakiyama et al. | ................. | 701/1 |
| 7,069,128 B2 * | 6/2006 | Iwama | ............................. | 701/36 |
| 7,075,456 B2 | 7/2006 | Tanaka et al. | | |
| 7,257,486 B2 * | 8/2007 | Shimazaki et al. | ........... | 701/300 |
| 7,366,595 B1 * | 4/2008 | Shimizu et al. | ................ | 701/301 |
| 2002/0084916 A1 * | 7/2002 | Shimizu et al. | ............. | 340/932.2 |
| 2002/0175832 A1 * | 11/2002 | Mizusawa et al. | .......... | 340/932.2 |
| 2003/0030724 A1 * | 2/2003 | Okamoto | ....................... | 348/148 |
| 2003/0156045 A1 * | 8/2003 | Tanaka et al. | .............. | 340/932.2 |
| 2004/0119610 A1 * | 6/2004 | Maemura et al. | ........... | 340/932.2 |
| 2004/0130464 A1 * | 7/2004 | Schindler et al. | ........... | 340/932.2 |

FOREIGN PATENT DOCUMENTS

| | | |
|---|---|---|
| CN | 1591258 A | 3/2005 |
| EP | 0 316 972 A2 | 5/1989 |
| EP | 0 316 972 A3 | 5/1989 |

(Continued)

*Primary Examiner* — Jennifer Mehmood
*Assistant Examiner* — Naomi Small
(74) *Attorney, Agent, or Firm* — Oblon, Spivak, McClelland, Maier & Neustadt, L.L.P.

(57) ABSTRACT

To provide a parking support device for easily and quickly moving or rotating a target parking frame to an appropriate position. The parking support device includes a target parking position setting unit configured to set a target parking position at which a vehicle is to be parked with a target parking frame superimposed on an actual image displaying an area surrounding the vehicle. The parking support device guides the vehicle to the target parking position set by the target parking position setting unit. The target parking position setting unit moves the target parking frame initially displayed on a touch display to a position indicated by a coordinate point determined by a touch operation.

13 Claims, 10 Drawing Sheets

FOREIGN PATENT DOCUMENTS

| | | |
|---|---|---|
| JP | 2-261276 | 10/1990 |
| JP | 9-33278 | 2/1997 |
| JP | 11-288460 | 10/1999 |
| JP | 2003 81041 | 3/2003 |
| JP | 2003 212073 | 7/2003 |
| JP | 2004-284370 | 10/2004 |
| JP | 2004 291867 | 10/2004 |
| JP | 2004 314695 | 11/2004 |
| JP | 2004 322944 | 11/2004 |
| JP | 2004 345496 | 12/2004 |
| JP | 2005 67263 | 3/2005 |
| JP | 2005-067565 | 3/2005 |
| JP | 2005 75016 | 3/2005 |
| JP | 2005-99403 | 4/2005 |
| JP | 2007-76496 | 3/2007 |
| WO | WO 00/16186 A2 | 3/2000 |
| WO | WO 00/16186 A3 | 3/2000 |

* cited by examiner

PARKING SUPPORT DEVICE

TECHNICAL FIELD

The present invention relates to parking support devices, and more particularly to a parking support device for setting a target parking position at which a vehicle is to be parked and guide the vehicle to the set target parking position.

BACKGROUND ART

A parking support device is for supporting a driver to park a vehicle by acquiring, with the use of a camera and a distance sensor, the relationship between the present position of the vehicle and the position at which the driver intends to park the vehicle, and automatically steering the vehicle by Electric Power Steering (hereinafter, "EPS").

The following is an example of a method of setting the position at which the driver intends to park the vehicle (hereinafter, "target parking position"). Specifically, the vehicle is temporarily stopped near the target parking position, this position information is stored (see, for example, Patent Document 1), or information of the target parking position is acquired by examining the parking space with a distance measuring sensor (see, for example, Patent Document 2). After moving the vehicle to a position for starting to park the vehicle, based on the above information, an initial position of a target parking frame for determining the target parking position is superimposed on an image showing the environment surrounding the vehicle. The target parking frame is moved or rotated on the image to adjust the target parking position.

Furthermore, there is known a parking support device in which a target parking frame for determining the target parking position at which a vehicle is to be parked is superimposed on an image showing the environment surrounding the vehicle, and the target parking frame is moved or rotated on the image to adjust the target parking position (see, for example, Patent Document 3). In such a parking support device, the path to the set target parking position is calculated, and the vehicle is guided along the calculated path.

Patent Document 1: Japanese Laid-Open Patent Application No. 2005-75016
Patent Document 2: Japanese Laid-Open Patent Application No. 2003-81041
Patent Document 3: Japanese Laid-Open Patent Application No. 2005-67263

DISCLOSURE OF INVENTION

Problems to be Solved by the Invention

However, the inventions described in Patent Documents 1 and 2 have the following problems. In a case where it is necessary to adjust the position of the target parking frame because the vehicle has temporarily stopped at an inappropriate position or the parking space is so large that the target parking position is difficult to determine, the target parking frame is moved up, down, left, and right with the use of direction buttons. However, each time the direction button is operated, the target parking frame moves only by a short distance. Therefore, there may be cases where it is difficult to quickly move the target parking frame to the desired position.

Furthermore, in the invention described in Patent Document 3, the rotation center, which is used when rotating the target parking frame, corresponds to the center of the target parking frame. Therefore, in order to make the target parking frame match a position that is partitioned by white lines in the actual image and that is tilted in the image, the target parking frame not only needs to be matched, but also moved up/down/left/right. This makes it difficult to make adjustments. In particular, in a case where there is a large distance between the vehicle and the target parking position, if the target parking frame is displaced even slightly, the vehicle may be guided inappropriately. Furthermore, the target parking frame is moved with the use of direction buttons, and therefore it may be difficult to move the target parking frame to the desired position.

In view of the above problems, an object of the present invention is to provide a parking support device for easily and quickly moving the target parking frame to an appropriate position.

Furthermore, an object of the present invention is to provide a parking support device for easily and quickly rotating the target parking frame.

Means for Solving the Problems

In order to achieve the above objects, a parking support device according to a first invention is characterized by including a target parking position setting unit configured to set a target parking position at which a vehicle is to be parked by superimposing a predetermined target parking frame on an actual image displaying an area surrounding the vehicle, wherein the parking support device guides the vehicle to the target parking position set by the target parking position setting unit; and the target parking position setting unit moves the target parking frame initially displayed on a touch display to a position indicated by one coordinate point determined by a touch operation.

A second invention is preferably characterized as being the parking support device according to the first invention, wherein the target parking frame has a rectangular shape representing the vehicle; and one of four corners of the target parking frame is moved to coincide with said one coordinate point.

A third invention is preferably characterized as being the parking support device according to the first or the second invention, further including a feature point recognition unit configured to recognize a feature point from the actual image displaying the area surrounding the vehicle, wherein the target parking position setting unit moves said one coordinate point to one feature point that is recognized by the feature point recognition unit and that is nearest to said one coordinate point, and moves the target parking frame to a position indicated by said one feature point.

A fourth invention is preferably characterized as being the parking support device according to the third invention, wherein said one feature point includes one point along a parking section line marked on the ground; and the target parking position setting unit moves the target parking frame to a position indicated by said one point along the parking section line to arrange the target parking frame in such a manner as to substantially correspond to the parking section line.

A fifth invention is a parking support device characterized by including a target parking position setting unit configured to set, based on a position of a predetermined target parking frame, a target parking position at which a vehicle is to be parked by superimposing the target parking frame on an actual image displaying an area surrounding the vehicle, wherein the parking support device guides the vehicle to the target parking position set by the target parking position setting unit; and the target parking position setting unit moves the target parking frame to a position determined by one coordinate point, and uses said one coordinate point as a rotation center of the target parking frame.

A sixth invention is characterized as being the parking support device according to the fifth invention, wherein the target parking frame has a rectangular shape representing the vehicle; and one of four corners of the target parking frame is moved to coincide with the position determined by said one coordinate point.

A seventh invention is characterized as being the parking support device according to the fifth or the sixth invention, further including a rotation center highlighting unit configured to highlight the rotation center in such a manner that the rotation center can be identified.

An eighth invention is characterized as being the parking support device according to the fifth through seventh inventions, further including a translucent display unit configured to display, in a translucent manner, the target parking frame to be superimposed on the actual image displaying the area surrounding the vehicle.

ADVANTAGEOUS EFFECT OF THE INVENTION

By the aforementioned means, the present invention can provide a parking support device for easily and quickly moving the target parking frame to an appropriate position.

Furthermore, the present invention can provide a parking support device for easily and quickly rotating the target parking frame.

EXPLANATION OF REFERENCES 10, 110 parking support device
12, 112 parking assist-use electronic control unit (parking assist ECU)
14, 114 back camera
16, 116 touch display
18, 118 electric power steering device (EPS)
20, 120 memory
C arrow button switches
F feature point
K confirm button switch
P parking base point position
Q rotation center
R return button switch
S target parking frame
W parking section lines
X, Y coordinate points

BEST MODE FOR CARRYING OUT THE INVENTION

The best mode for carrying out the invention is described based on the following embodiments with reference to the accompanying drawings.

First Embodiment

Figure 1:
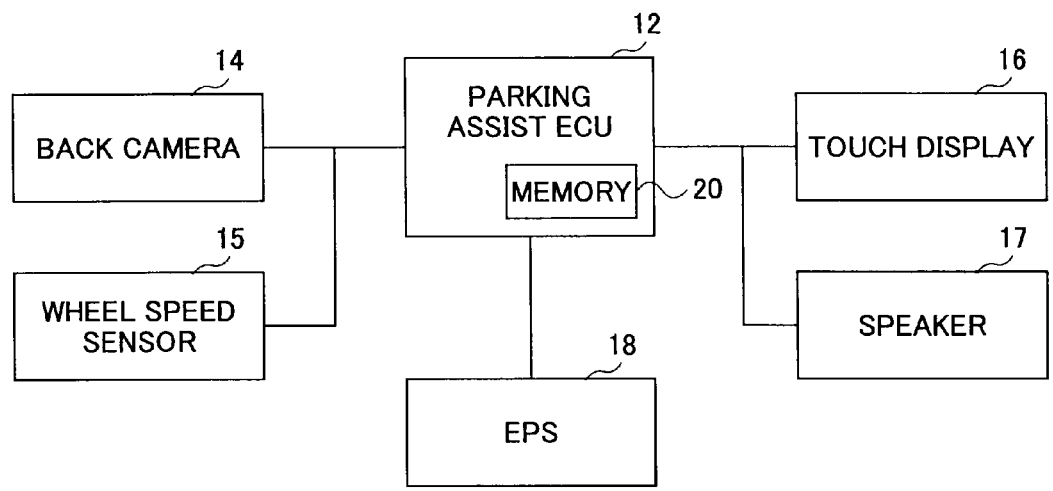
FIG. 1 is a system configuration diagram of a parking support device according to a first embodiment of the present invention installed in a vehicle.

FIG. 1 illustrates a configuration of a parking support device 10 according to the present invention. When parking a vehicle in a garage (parking section) or when performing parallel parking, the parking support device 10 automatically steers the vehicle without the driver's operation to move the vehicle to a target parking position specified by the driver. Hereinafter, movement control performed by this device for moving the vehicle to the target parking position is referred to as parking assist control.

As shown in FIG. 1, the parking support device 10 includes a parking assist-use electronic control unit (hereinafter, "parking assist ECU") 12, a back camera 14, a wheel speed sensor 15, a touch display 16, a speaker 17, and an EPS 18.

The parking assist ECU 12 has a built-in memory 20 that can be used for reading and writing data, and is connected to the back camera 14, the wheel speed sensor 15, the touch display 16, and the EPS 18 via a CAN (Controller Area Network). The memory 20 stores position information on a road (absolute coordinates) of a target parking position that is set by the driver as described below, and path information of the path to the target parking position generated by calculation. The information stored in the memory 20 is usually erased when parking assist control is completed, such as when the shift position has been shifted from a reverse position to the parking position or a neutral position or when the vehicle has come near the target parking position. The back camera 14 is disposed at the center rear part of the vehicle and takes photographs of a region extending behind the vehicle in a predetermined angle range. The image information of the area behind the vehicle photographed by the back camera 14 is supplied to the parking assist ECU 12. A feature point recognition unit processes the image received from the back camera 14 and recognizes feature points. "Feature points" are points that can be indicators for setting the target parking position such as white lines indicating a parking section on the ground, side lines of a road, road shoulders, gutters, and wheel clamps. Feature points can be displayed on the touch display 16 so as to be recognizable, or the feature points can be potentially included without being displayed. The image process can be performed by a smoothing process, shading correction, a spatial filtering process, a binarization process, binary image processing, etc., and the feature points are recognized by pattern recognition.

The wheel speed sensor 15 is provided on a steering knuckle arm and detects the speed at which a wheel is rotating. The parking assist ECU 12 receives signals from the wheel speed sensor 15, and can acquire the vehicle speed and the vehicle movement distance.

The touch display 16 is a display device including an input device with which an operator can input coordinate values by touching a screen, and is disposed at a position where it can be seen and operated by the operator (for example, at the center of the instrument panel). The parking assist ECU 12 displays an actual image photographed by the back camera 14 on the touch display 16 if the shift position of the vehicle is at a reverse position. In response to commands from the parking assist ECU 12, the touch display 16 displays an image of the area behind the vehicle taken by the back camera 14. Furthermore, in response to commands from the parking assist ECU 12, the touch display 16 superimposes, on the actual image taken by the back camera 14, auxiliary lines for the parking assist control, the target parking frame for determining the target parking position, and a parking unpermitted region indicating the region in which vehicles cannot be parked, and displays operation contents and help messages according to the screen display.

Furthermore, the touch display 16 includes a pressure type or a thermal sensing type touch operation unit that can be operated by the operator. The touch operation unit includes plural hierarchical switches which are displayed on the display screen in response to commands from the parking assist ECU 12.

The speaker 17 is a device for outputting voices, and outputs warnings and messages generated by the parking assist ECU 12.

The parking assist ECU 12 detects a touch operation by an operator on the touch operation unit and executes a process based on the contents of the touch operation unit. The touch operation unit includes a switch for starting a garage (parking section) parking mode (hereinafter, "parking section parking mode") as the parking assist control, a switch for starting a parallel parking mode, and arrow button switches for determining the target parking position for the driver to park the vehicle.

The EPS 18 includes a torque sensor for detecting steering torque applied to a steering shaft as the driver steers the vehicle, a rudder angle sensor for detecting the rudder angle of the steering shaft, and an electric motor for applying torque to the steering shaft.

The EPS 18 causes the electric motor to generate torque for assisting the steering torque when the driver steers the vehicle, and as described below, causes the electric motor to generate torque for steering the vehicle for parking the vehicle by parking assist control without having the driver steer the vehicle, such as when parking the vehicle in a garage (parking section) or when performing parallel parking.

Furthermore, the EPS 18 supplies the rudder angle information of the detected steering shaft to the parking assist ECU 12. When executing parking assist control, the parking assist ECU 12 supplies to the EPS 18 a target rudder angle to be realized by the steering shaft as described below. When the target rudder angle is supplied from the parking assist ECU 12, the EPS 18 will cause the electric motor to generate torque for the parking assist control, and will then feed back the detected rudder angle to the parking assist ECU 12.

Next, a description is given of operations of the parking support device 10.

Figure 2:
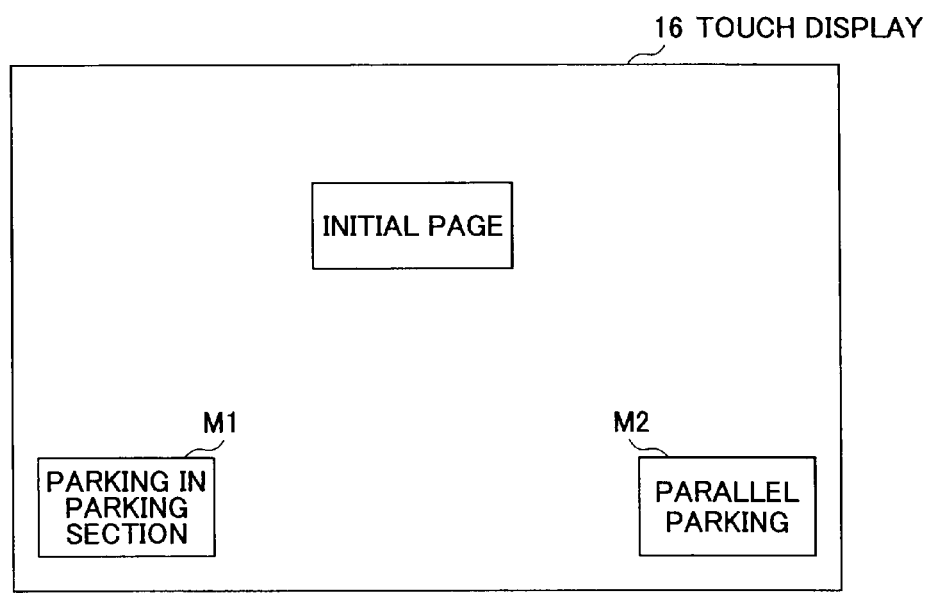
FIG. 2 is an initial page displayed on a display screen when parking support is performed by the parking support device according to the present embodiment.
Figure 3:
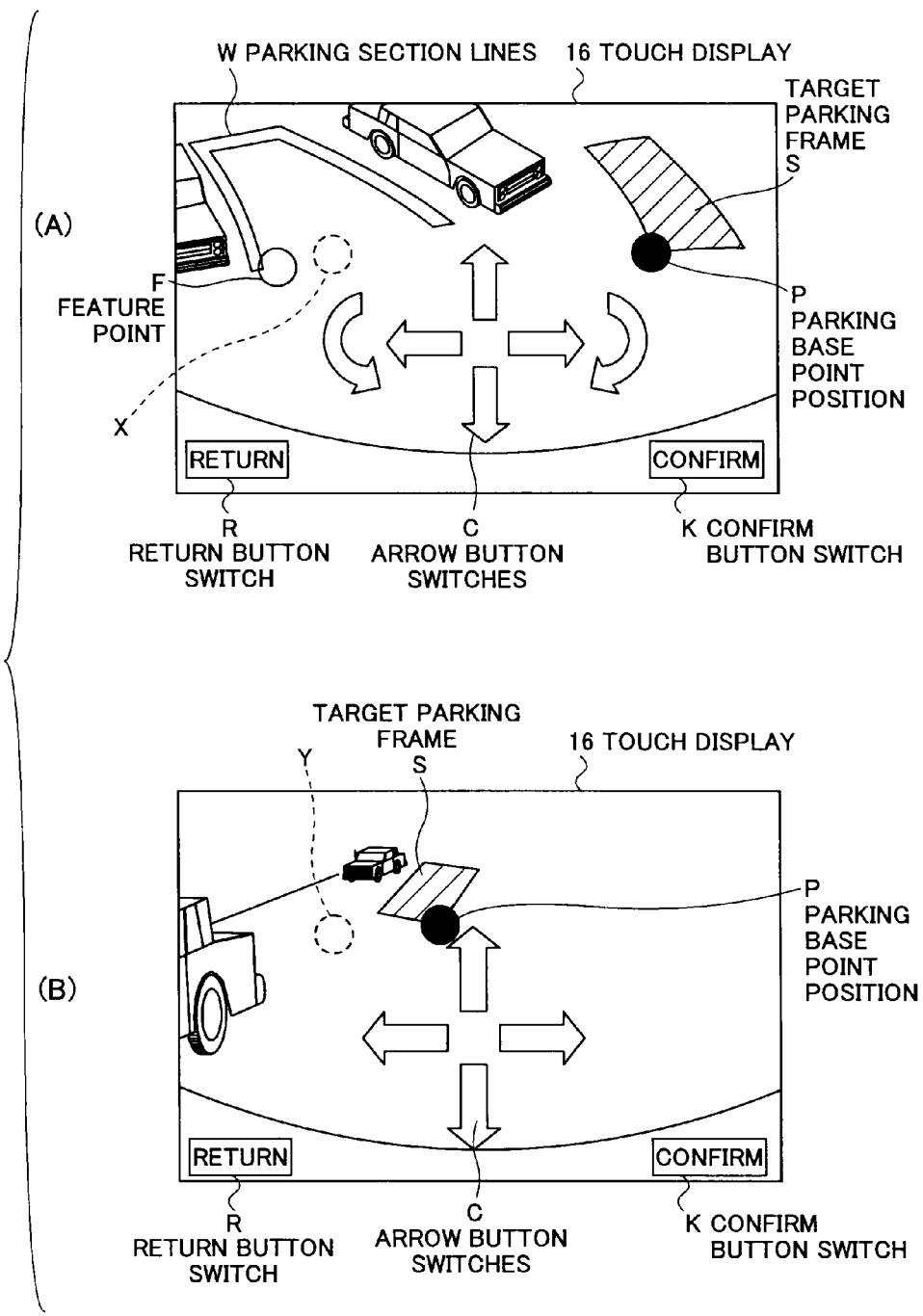
FIG. 3 illustrates images displayed on the display screen when the target parking position is determined in the parking support device according to the present embodiment.

FIG. 2 illustrates an initial page displayed on the display screen of the touch display 16 when parking support is performed by the parking support device 10 according to the present embodiment. In FIG. 3, (A) illustrates an image displayed on the display screen of the touch display 16 when a parking section parking mode has been selected in the parking support device 10. In FIG. 3, (B) illustrates an image displayed on the display screen of the touch display 16 when a parallel parking mode has been selected in the parking support device 10.

When the shift position of the vehicle is shifted to the reverse position, an image of the area behind the vehicle taken by the back camera 14 is displayed on the display screen of the touch display 16. At this time, as shown in FIG. 2, a switch M1 for starting the parking section parking mode as the parking assist control and a switch M2 for starting the parallel parking mode as the parking assist control will appear on the display screen (initial page).

When the parking section parking mode switch M1 is touched, as shown in (A) of FIG. 3, a target parking frame S for indicating the target parking position for parking the vehicle in a parking section on a road, a parking base point position P corresponding to a standard position for positioning the target parking frame S, and arrow button switches C for moving or rotating the target parking frame S on the road are superimposed on the image of the area behind the vehicle taken by the back camera 14 displayed on the display screen of the touch display 16.

The target parking frame S corresponds to the target parking position on the actual road and has a rectangular shape that will substantially match the size of the vehicle if projected on the actual road. However, on the display screen of the touch display 16, the target parking frame S has a shape corresponding to the position behind the vehicle on the image (on camera coordinates) taken by the back camera shown on the display screen. Furthermore, each time the driver touches the arrow button switches C, the target parking frame S moves by X cm (for example, 5 cm) in the scale on the actual road or rotates by Y° (for example, 1°), thereby changing the position of the target parking frame S on the display screen of the touch display 16. At this time, as the target parking position becomes closer to the vehicle, the movement amount of the target parking frame S on the display screen of the touch display 16 becomes greater, due to the perspective relationship in the image behind the vehicle taken by the back camera 14.

The target parking frame S is roughly determined beforehand. Specifically, before the parking assist control starts, the driver temporarily stops the vehicle near the target parking position, and stores position information of the target parking position in the parking support device, or causes the distance measuring sensor to examine the parking space and acquire information on the target parking position.

The parking base point position P is one point of the frame of the target parking frame S and corresponds to a standard position for positioning the target parking frame S. The parking base point position P is preferably positioned at a corner of the target parking frame S. This is because a corner or an edge in parking section lines W is often set as the point corresponding to an indicator for positioning the target parking frame, and it is easier to superimpose the target parking frame S onto the parking section lines W if the parking base point position P is positioned at a corner of the target parking frame S. When a wheel clamp is set as the point to be an indicator for positioning the target parking frame, the parking base point position P can be positioned at the center of one of the short sides of the target parking frame S representing the width of the vehicle.

The arrow button switches C include an upward switch for moving the target parking frame S away from the vehicle on the road, a downward switch for moving the target parking frame S toward the vehicle, a leftward switch for moving the target parking frame S toward the left, a rightward switch for moving the target parking frame S toward the right, a counter clockwise switch for rotating the target parking frame S in a counter clockwise direction, and a clockwise switch for rotating the target parking frame S in a clockwise direction.

Furthermore, when the parallel parking mode switch M2 is touched, as shown in (B) of FIG. 3, a target parking frame S for indicating the target parking position for parallel-parking the vehicle on a road, a parking base point position P corresponding to a standard position for positioning the target parking frame S, and arrow button switches C for moving the target parking frame S on the road are superimposed on the image of the area behind the vehicle taken by the back camera 14 displayed on the display screen of the touch display 16. As the arrow button switches C, the above-mentioned upward switch, downward switch, leftward switch, and rightward switch appear, but neither the counter clockwise switch nor the clockwise switch will appear. This is because in the case of the parallel parking mode, it is less likely that the target parking frame S will be fine adjusted by being rotated compared to the parking section parking mode. However, it is possible to use the counter clockwise switch and the clockwise switch in the parallel parking mode, similar to the parking section parking mode.

In both parking modes, with the target parking position setting unit, the operator can move the target parking frame S by touching a part other than the arrow button switches C on the touch display. For example, by touching a coordinate point X or Y in FIG. 3, a parking base point position P of the target parking frame S can be moved quickly to the position of the coordinate point X or Y.

Furthermore, the target parking position setting unit can make the coordinate point X or Y move automatically (snap) to a feature point that is closest to the coordinate point. Accordingly, even if the operator roughly specifies a coordinate position, the target parking frame S can be accurately positioned along parking section lines W.

In principle, the target parking frame S is moved while maintaining its posture before being moved. This is because the target parking frame S is roughly determined beforehand by storing position information. Specifically, the driver temporarily stops the vehicle near the target parking position and stores position information of the target parking position, or causes the distance measuring sensor to examine the parking space and acquire information on the target parking position. However, the target parking frame S can be automatically adjusted so that its posture after movement substantially matches the white lines of the parking section lines W. This is because the parking support device 10 is aware of the positions of the white lines of the parking section lines W by image processing.

Figure 4:
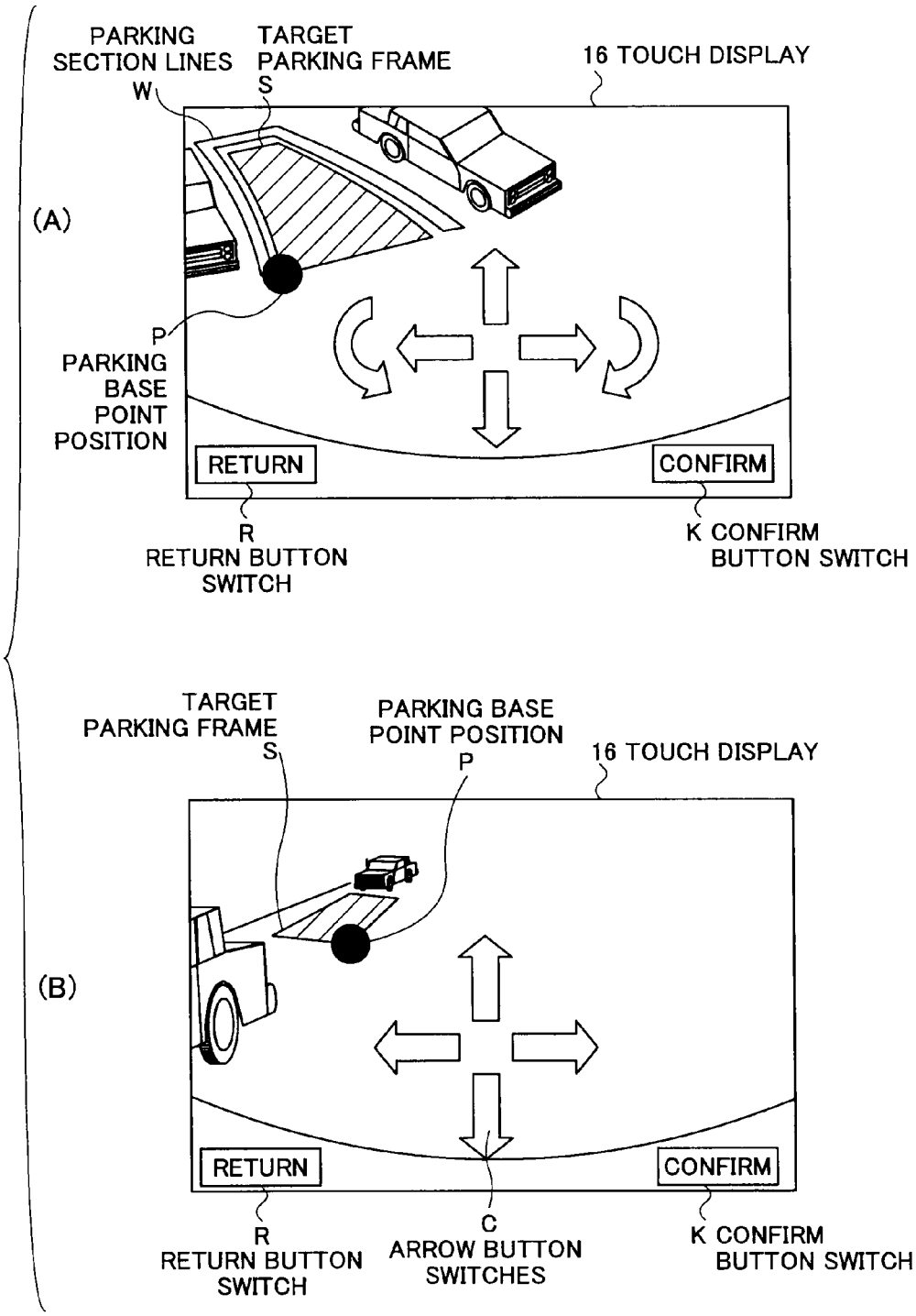
FIG. 4 illustrates images displayed on a display screen after the target parking position has been moved in the parking support device according to the present embodiment.

In FIG. 4, (A) illustrates the situation after the target parking frame S has been moved by touching the coordinate point X, and (B) illustrates the situation after the target parking frame S has been moved by touching the coordinate point Y. In (A) of FIG. 3, the coordinate point X specified by a touch operation is slightly displaced from the left edge of the parking section lines W corresponding to feature point F. However, as shown in (A) of FIG. 4, the target parking position setting unit has automatically moved the coordinate point X to the feature point F so that the parking base point position P of the target parking frame S coincides with the feature point F, so that the target parking frame S is appropriately included in the parking section lines W. Meanwhile, the coordinate point Y specified by a touch operation in (B) of FIG. 3 does not have any feature points around it, and therefore, a movement described with reference to (B) of FIG. 4 is not made. Instead, as shown in (B) of FIG. 4, the target parking position setting unit makes the parking base point position P of the target parking frame S coincide with the coordinate point Y.

Accordingly, without requiring the operator to push the arrow button switches C, the parking support device 10 can move the target parking frame S to a desired position by a single touch. Therefore, it is extremely easy to set the target parking frame S.

In this case, it is also possible to use the upward switch, the downward switch, the leftward switch, and the rightward switch for fine adjusting the position of the target parking frame S.

As described above, the target parking position setting unit displays the target parking frame S and the parking base point position P to allow an operator to set the target parking position by touching the arrow button switches C or directly touching a coordinate point on the touch display.

Furthermore, a parking base point position highlighting unit can let the operator easily see where the parking base point position P is by indicating the parking base point position P with figures such as a circle or a rectangle that is larger than the frame lines, or by indicating the parking base point position P with a different color, or by blinking the parking base point position P.

A translucent display unit displays the target parking frame S and the parking base point position P in a translucent manner so that even when the target parking frame S and the parking base point position P are superimposed on the actual image, the actual image is visible.

The target parking position setting unit, the feature point recognition unit, the parking base point position highlighting unit, and the translucent display unit are realized by causing a not shown CPU (Central Processing Unit) to execute a program stored in a not shown ROM in the parking assist ECU 12.

From the point when the target parking frame S, the parking base point position P, and the arrow button switches C are displayed on the display screen of the touch display 16, at every predetermined time point (for example, every two minutes), the following calculation is performed. That is, assuming that the current position of the vehicle at a certain time point is an initial position, a path from the initial position to the target parking position corresponding to the set position of the target parking frame S is calculated.

Furthermore, when the parking section parking mode switch M1 or the parallel parking mode switch M2 is touched, in addition to the target parking frame S, the parking base point position P, the arrow button switches C as shown in FIG. 3, a confirm button switch K for finalizing the setting of the target parking position indicated by the target parking frame S, and a return button switch R for returning to the previous page are also superimposed. When the confirm button switch K is touched after the path to the target parking position has been generated by calculation, the set target parking position is determined, and thereafter, execution of automatic steering performed by parking assist control is permitted.

Figure 5:
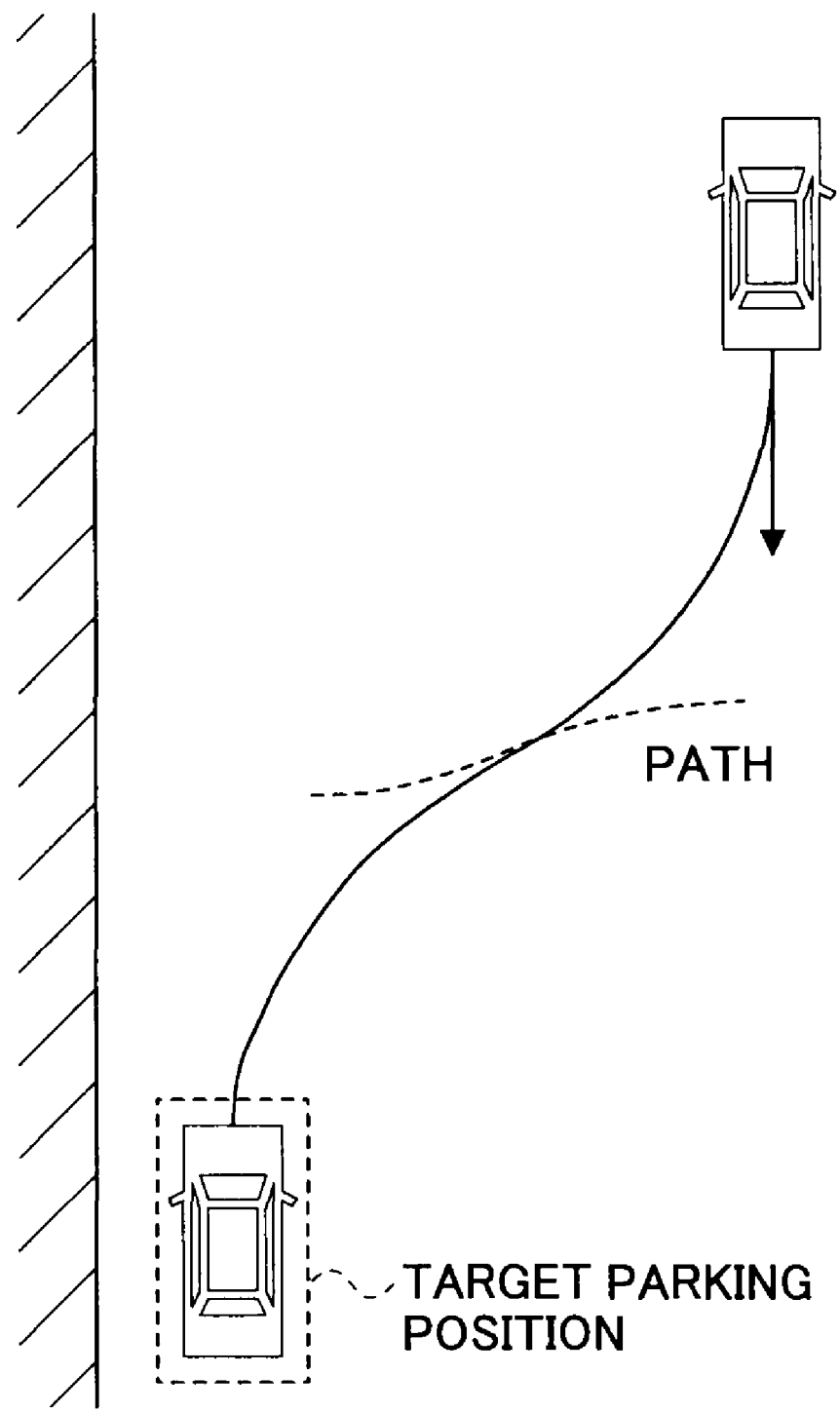
FIG. 5 illustrates a path to a target parking position for parking a vehicle in a parking section.

FIG. 5 illustrates a path to the target parking position for parking a vehicle in a parking section. In the parking section parking mode, the path to the target parking position is calculated as follows. A predetermined geometric positional condition is determined by a relative positional relationship between the minimum turning radius, the present position of the vehicle, and the target parking position. When this predetermined geometric positional condition is satisfied, the path to the target parking position is calculated based on the relative positional relationship in such a manner that the following sections are appropriately formed. That is, (1) a section for proceeding/reversing within a predetermined distance, (2) a section for increasing the rudder angle, (3) a section for fixing the rudder angle, (4) a section for decreasing the rudder angle, and (5) a section for proceeding/reversing within a predetermined distance are formed in this order in the path.

Figure 6:
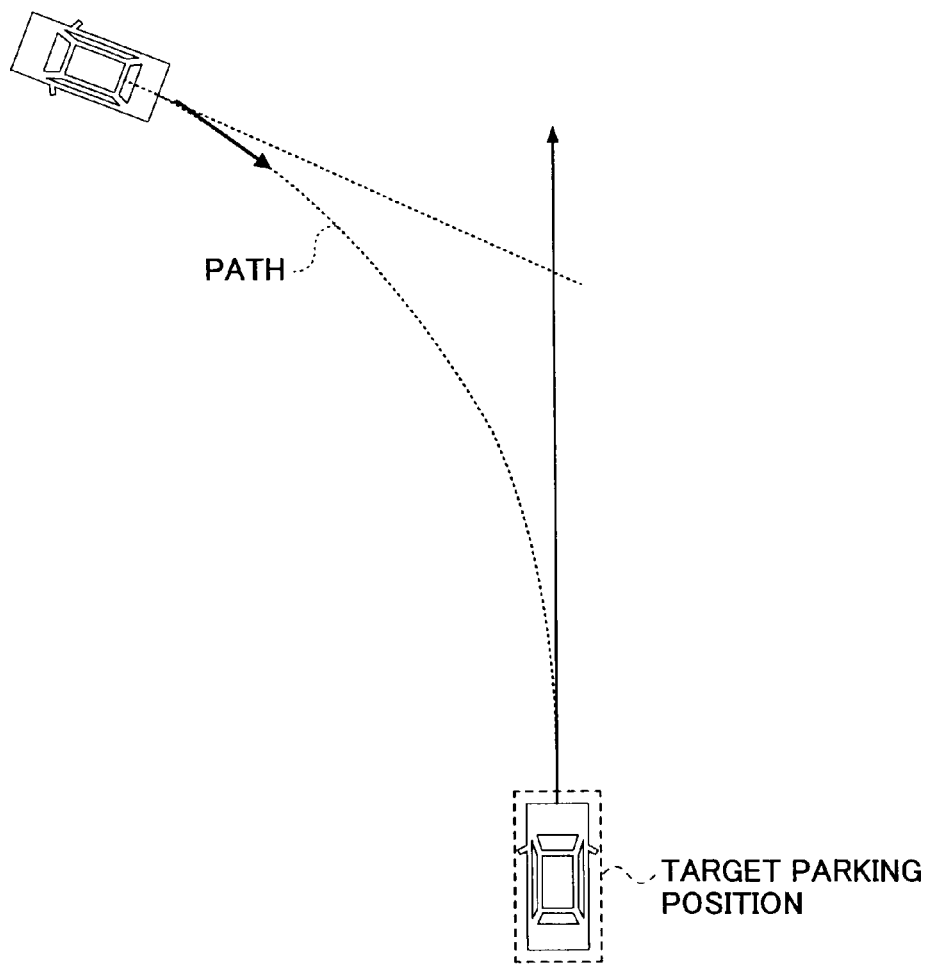
FIG. 6 illustrates a path to a target parking position for parallel-parking a vehicle.

FIG. 6 illustrates a path to the target parking position for parallel-parking a vehicle. In the parallel parking mode, the path to the target parking position is calculated as follows. A predetermined geometric positional condition is determined by a relative positional relationship between the minimum turning radius, the present position of the vehicle, and the target parking position. When this predetermined geometric positional condition is satisfied, the path to the target parking position is calculated based on the relative positional relationship in such a manner as to form a path having two circles tangent to each other.

In the parking section parking mode and in the parallel parking mode, the path to the target parking position is calculated. When the path is generated, the target parking position information and the path information are stored in the memory 20. Additionally, on the display screen of the touch display 16, the inside of the target parking frame S is colored green, for example, which indicates that parking assist control can be executed. When the path to the target parking position is generated by the calculation, and the confirm button switch K of the touch display 16 is touched when the inside of the target parking frame S is colored green, the arrow button switches C and the confirm button switch K disappear from the touch display 16.

Meanwhile, if the path to the target parking position is not generated by calculation because the relative positions between the vehicle and the target parking position do not satisfy a predetermined relationship, the inside of the target parking frame S is colored red, for example, to indicate that the parking assist control cannot be executed. Additionally, to prompt the operator to change the target parking position, the arrow button switches C and the confirm button switch K are continuously displayed.

When the driver releases the brakes and the vehicle starts to reverse due to a creeping phenomenon where the path to the target parking position is generated and the confirm button switch K on the touch display 16 is touched so that the target parking position is finalized, parking assist control is executed for guiding the vehicle to the target parking position. Specifically, the movement amount of the vehicle on the road after starting to reverse is calculated, and based on this calculated movement amount and the rudder angle information from the EPS 18, the position of the vehicle on the road to the target parking position is calculated. Then, the target rudder angle for moving the vehicle along the generated path is calculated. The calculated target angle is supplied to the EPS 18. Based on the target rudder angle from the parking assist ECU 12, the EPS 18 causes the electric motor to generate torque for rotating the steering shaft to move the vehicle along the generated path.

As described above, at the time of parking section parking and parallel parking, it is possible to execute parking assist control for automatically steering the vehicle along a path to the target parking position set by an operator's operation. If such parking assist control is executed, the driver does not need to steer the vehicle. Accordingly, with the parking support device 10 according to the present embodiment, the driver's workload of steering the vehicle is reduced at the time of parking section parking and parallel parking.

A preferred embodiment of the present invention is described above; however, the present invention is not limited to the specifically disclosed embodiment, and variations and modifications may be made without departing from the scope of the present invention.

For example, in the above embodiment, the target parking position setting unit can wait for a touch operation by the operator to move the target parking frame or automatically move the target parking frame to the nearest feature point without waiting for a touch operation by the operator. The target parking frame is positioned beforehand somewhat accurately when the vehicle is temporarily stopped and a space recognition method is performed. Therefore, if the parking base point position is only slightly displaced from the feature point, the parking base point position is automatically moved to a position indicated by the feature point so that the operator can start the parking assist control without having to adjust the position of the target parking frame.

Second Embodiment

Figure 7:
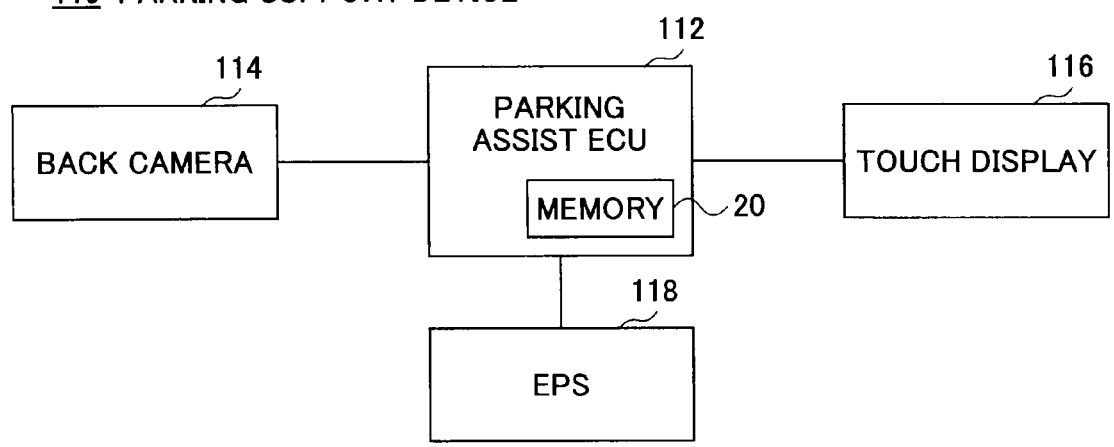
FIG. 7 is a system configuration diagram of a parking support device according to a second embodiment of the present invention installed in a vehicle.

FIG. 7 illustrates a configuration of a parking support device 110 according to a second embodiment of the present invention. The parking support device 110 is for supporting the operation of parking a vehicle in a parking section or when parallel parking the vehicle. Specifically, the parking support device 110 moves the vehicle to a target parking position determined by the operator of the vehicle by automatically steering the vehicle without having the driver steer the vehicle. Hereinafter, movement control performed by this device for moving the vehicle to the target parking position is referred to as parking assist control.

As shown in FIG. 7, the parking support device 110 includes a parking assist-use electronic control unit (hereinafter, "parking assist ECU") 112, a back camera 114, a touch display 116, and an EPS 118.

The parking assist ECU 112 is connected to the back camera 114, the touch display 116, and the EPS 118. The parking assist ECU 112 has a built-in memory 120 that can be used for reading and writing data. The memory 120 stores position information on a road (absolute coordinates) of a target parking position that is set by the driver as described below, and path information of the path to the target parking position generated by calculation. The information stored in the memory 120 is usually erased when parking assist control is completed, such as when the shift position has been shifted from a reverse position to the parking position or a neutral position, or when the vehicle has come near the target parking position.

The back camera 114 is disposed at the center rear part of the vehicle and takes photographs of a region extending behind the vehicle in a predetermined angle range. The image information of the area behind the vehicle photographed by the back camera 114 is supplied to the parking assist ECU 112.

The touch display 116 is disposed at a position where it can be seen and operated by the operator of the vehicle (for example, at the center of the instrument panel). The parking assist ECU 112 displays an actual image photographed by the back camera 114 on the touch display 116 if the shift position of the vehicle is at a reverse position. In response to commands from the parking assist ECU 112, the touch display 116 displays an image of the area behind the vehicle taken by the back camera 114. Furthermore, in response to commands from the parking assist ECU 112, the touch display 116 superimposes, on the actual image taken by the back camera 114, auxiliary lines for the parking assist control and the target parking frame for determining the target parking position.

The touch display 116 includes a pressure type or a thermal sensing type touch operation unit that can be operated by the operator of the vehicle. The touch operation unit includes plural hierarchical switches, which are displayed on the display screen in response to commands from the parking assist ECU 112.

The parking assist ECU 112 detects a touch operation by an operator of the vehicle on the touch operation unit and executes a process based on the contents of the touch operation unit. The touch operation unit includes a switch for starting a parking section parking mode as the parking assist control, a switch for starting a parallel parking mode, and arrow button switches for determining the target parking position for the driver to park the vehicle.

The EPS 118 includes a torque sensor for detecting steering torque applied to a steering shaft as the driver steers the vehicle, a rudder angle sensor for detecting the rudder angle of the steering shaft, and an electric motor for applying torque to the steering shaft.

The EPS 118 causes the electric motor to generate torque for assisting the steering torque when the driver steers the vehicle, and also, as described below, causes the electric motor to generate torque for steering the vehicle for parking the vehicle by parking assist control without having the driver steer the vehicle, such as when parking the vehicle in a parking section or when performing parallel parking.

Furthermore, the EPS 118 supplies the rudder angle information of the detected steering shaft to the parking assist ECU 12. When executing parking assist control, the parking assist ECU 112 supplies to the EPS 18 a target rudder angle to be realized by the steering shaft as described below. When the target rudder angle is supplied from the parking assist ECU 112, the EPS 118 causes the electric motor to generate torque for the parking assist control, and then feeds back the detected rudder angle to the parking assist ECU 112.

Next, a description is given of operations of the parking support device 110.

Figure 8:
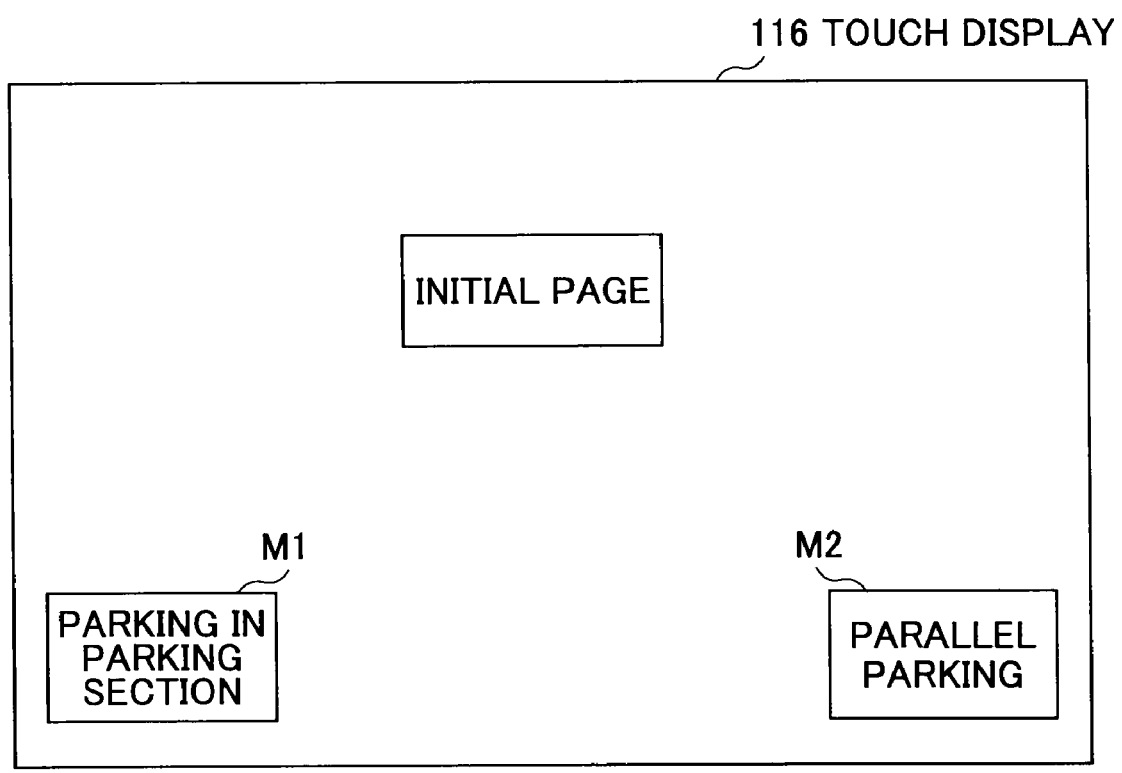
FIG. 8 is an initial page displayed on a display screen when parking support is performed by the parking support device according to the second embodiment of the present invention.
Figure 9:
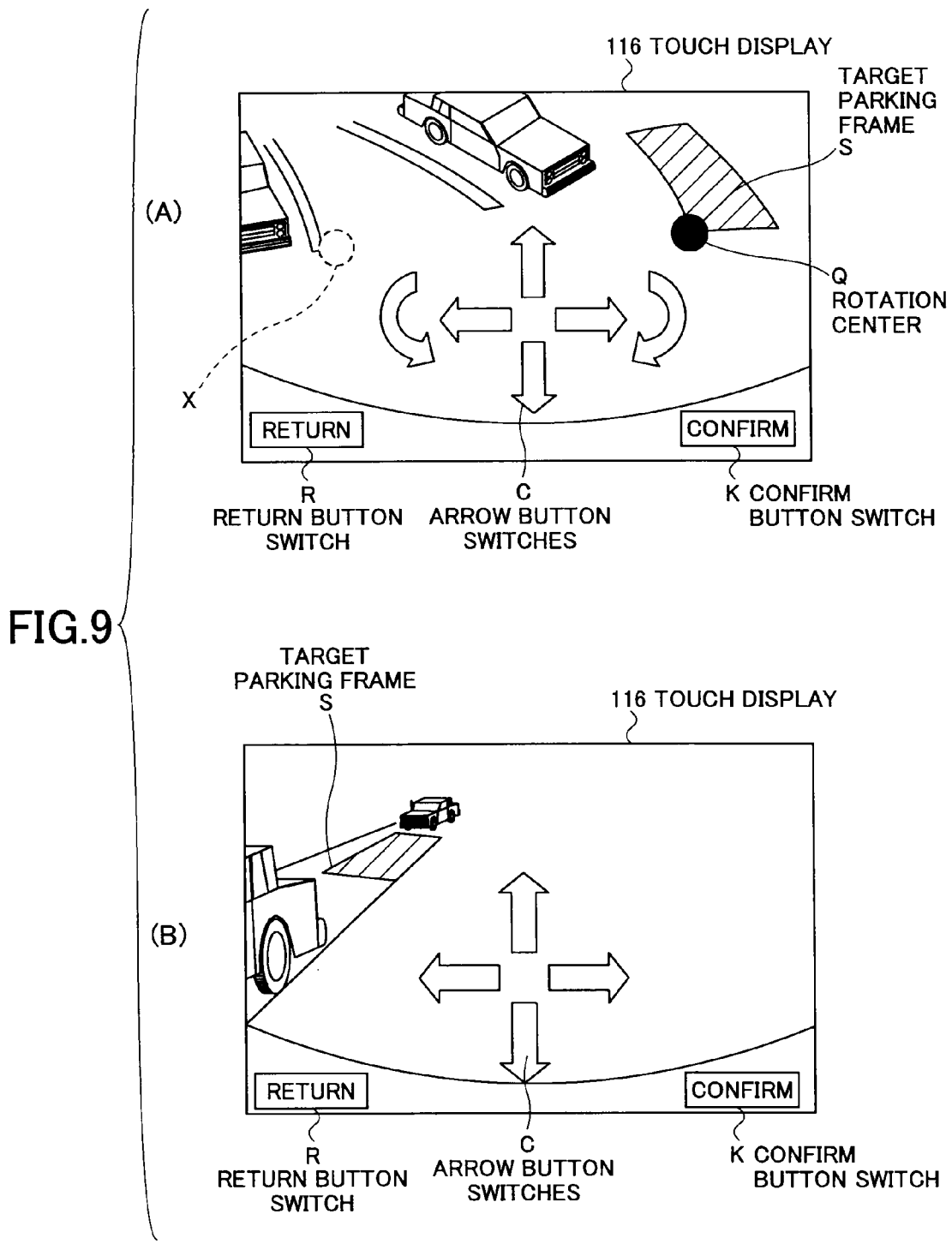
FIG. 9 illustrates images displayed on the display screen when the target parking position is determined in the parking support device according to the second embodiment of the present invention.

FIG. 8 illustrates an initial page displayed on the display screen of the touch display 116 when parking support is performed by the parking support device 110 according to the present embodiment. In FIG. 9, (A) illustrates an image displayed on the display screen of the touch display 116 when a parking section parking mode has been selected in the parking support device 110. In FIG. 9, (B) illustrates an image displayed on the display screen of the touch display 116 when a parallel parking mode has been selected in the parking support device 110.

When the shift position of the vehicle is shifted to the reverse position, an image of the area behind the vehicle taken by the back camera 114 is displayed on the display screen of the touch display 116. At this time, as shown in FIG. 8, a switch M1 for starting the parking section parking mode as the parking assist control and a switch M2 for starting the parallel parking mode as the parking assist control appear on the display screen (initial page).

When the parking section parking mode switch M1 is touched, as shown in (A) of FIG. 9, a target parking frame S for indicating the target parking position for parking the vehicle in a parking section on a road, a rotation center Q of the target parking frame S, and arrow button switches C for moving or rotating the target parking frame S on the road are superimposed on the image of the area behind the vehicle taken by the back camera 114 displayed on the display screen of the touch display 116.

The arrow button switches C include an upward switch for moving the target parking frame S away from the vehicle on the road, a downward switch for moving the target parking frame S toward the vehicle, a leftward switch for moving the target parking frame S toward the left, a rightward switch for moving the target parking frame S toward the right, a counter clockwise switch for rotating the target parking frame S in a counter clockwise direction, and a clockwise switch for rotating the target parking frame S in a clockwise direction.

Furthermore, when the parallel parking mode switch M2 is touched, as shown in (B) of FIG. 9, a target parking frame S for indicating the target parking position for parallel-parking the vehicle on a road and arrow button switches C for moving the target parking frame S on the road are superimposed on the image of the area behind the vehicle taken by the back camera 114 displayed on the display screen of the touch display 116. As the arrow button switches C, the above-mentioned upward switch, downward switch, leftward switch, and rightward switch appear, but neither the counter clockwise switch nor the clockwise switch will appear. This is because in the case of the parallel parking mode, there is less likelihood that the target parking frame S will be fine adjusted by being rotated compared to the parking section parking mode. However, it is possible to use the counter clockwise switch and the clockwise switch in the parallel parking mode, similar to the parking section parking mode.

In both parking modes, the vehicle operator can move the target parking frame S by touching a part other than the arrow button switches C on the touch display. For example, by touching a coordinate point X in (A) of FIG. 9, the rotation center Q of the target parking frame S can be moved quickly to the position of the coordinate point X.

Figure 10:
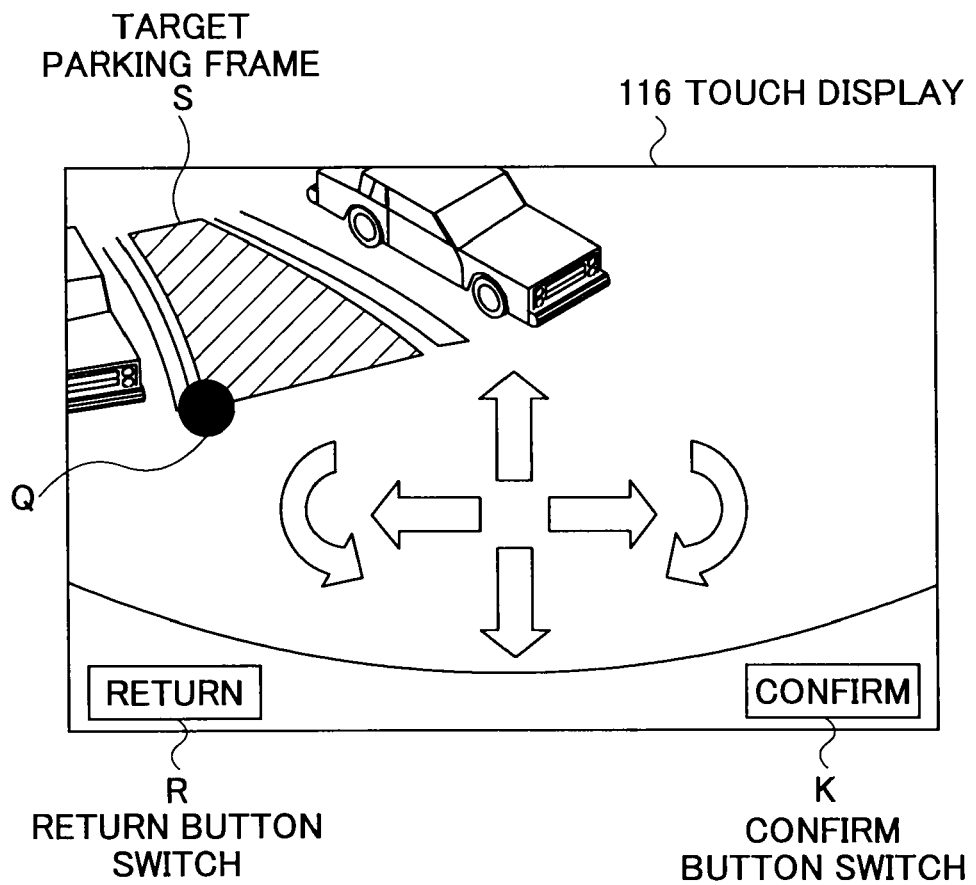
FIG. 10 illustrates an image displayed on a display screen after the target parking position has been determined in the parking support device according to the second embodiment of the present invention.

FIG. 10 illustrates the situation after the target parking frame S has been moved by touching the coordinate point X. In this case it is also possible to use the upward switch, the downward switch, the leftward switch, and the rightward switch for fine adjusting the position of the target parking frame S. The position to which the target parking frame S is to be moved can be determined by directly touching the touch display 116, without using the upward switch, the downward switch, the leftward switch, or the rightward switch.

The rotation center Q is a point on the frame lines of the target parking frame S, and is preferably positioned at a bottom left corner of the target parking frame S as shown in FIG. 10. Such an arrangement makes the following operation possible. For example, the vehicle operator touches the bottom left corner of the actual parking section frame partitioned by white lines so that the rotation center Q at the bottom left corner of the target parking frame S moves to coincide with the bottom left corner of the actual parking section frame partitioned by white lines. Subsequently, the counter clockwise switch or the clockwise switch is used to adjust the target parking frame S so as to overlap the actual parking section frame partitioned by white lines. If the rotation center Q is arranged at a corner of the target parking frame S, it is much easier to make adjustments by rotating the target parking frame S compared to a case where the rotation center Q is arranged at a position other than a corner on the target parking frame S. Furthermore, if the rotation center Q is arranged at a corner of the target parking frame S, it is more suitable for performing the series of operations of setting the target parking frame S at the target parking position, and it better facilitates the operation of determining the target parking frame S for the vehicle operator.

Figure 11:
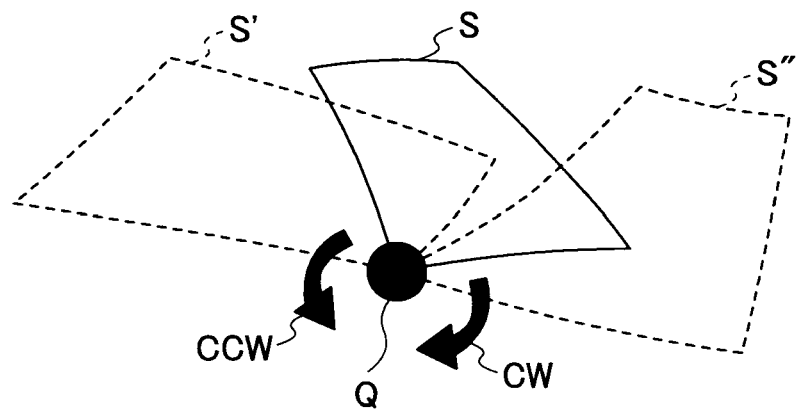
FIG. 11 illustrates a target parking frame S being rotated around a rotation center Q.

FIG. 11 illustrates the target parking frame S being rotated around the rotation center Q. When the counter clockwise switch is touched, the target parking frame S rotates around the rotation center Q in the CCW direction to a target parking frame S' indicated by dashed lines. Furthermore, when the clockwise switch is touched, the target parking frame S rotates around the rotation center Q in the CW direction to a target parking frame S" indicated by dashed lines.

The target parking frame S corresponds to the target parking position on the actual road, and has a rectangular shape that substantially matches the size of the vehicle if projected on the actual road. However, on the display screen of the touch display 16, the target parking frame S has a shape corresponding to the position behind the vehicle on the image (on camera coordinates) taken by the back camera 114 shown on the display screen. Furthermore, each time the driver touches the arrow button switches C, the target parking frame S moves by X cm (for example, 5 cm) in the scale on the actual road or rotates by Y° (for example, 1°), thereby changing the position of the target parking frame S on the display screen of the touch display 116. At this time, as the target parking position becomes closer to the vehicle, the movement amount of the target parking frame S on the display screen of the touch display 116 becomes greater due to the perspective relationship in the image behind the vehicle taken by the back camera 114.

As described above, the target parking position setting unit sets the target parking position when the operator touches the arrow button switches C or directly touches a coordinate point on the touch display, while the target parking frame S and the rotation center Q are displayed.

Furthermore, a rotation center highlighting unit can let the operator easily see where the rotation center Q is by indicating the rotation center Q with a figure such as a circle or a rectangle that is larger than the frame lines, or by indicating the rotation center Q with a different color, or by flashing the rotation center Q.

A translucent display unit displays the target parking frame S and the rotation center Q in a translucent manner so that even when the target parking frame S and the rotation center Q are superimposed on the actual image, the actual image is visible.

The target parking position setting unit, the rotation center highlighting unit, and the translucent display unit are realized by causing a not shown CPU (Central Processing Unit) to execute a program stored in a not shown ROM in the parking assist ECU 112.

From the point when the target parking frame S, the rotation center Q, and the arrow button switches C are displayed on the display screen of the touch display 116, at every predetermined time point (for example, every two minutes) the following calculation is performed. That is, assuming that the current position of the vehicle at a certain time point is an initial position, a path from the initial position to the target parking position corresponding to the set position of the target parking frame S is calculated.

Furthermore, when the parking section parking mode switch M1 or the parallel parking mode switch M2 is touched, in addition to the target parking frame S, the rotation center P, the arrow button switches C, as shown in (A) and (B) of FIG. 9, a confirm button switch K for determining the setting of the target parking position indicated by the target parking frame S, and a return button switch R for returning to the previous page are also superimposed. When the confirm button switch K is touched and the path to the target parking position has been generated by calculation, the set target parking position is determined, and thereafter, execution of automatic steering performed by parking assist control is permitted.

Figure 12:
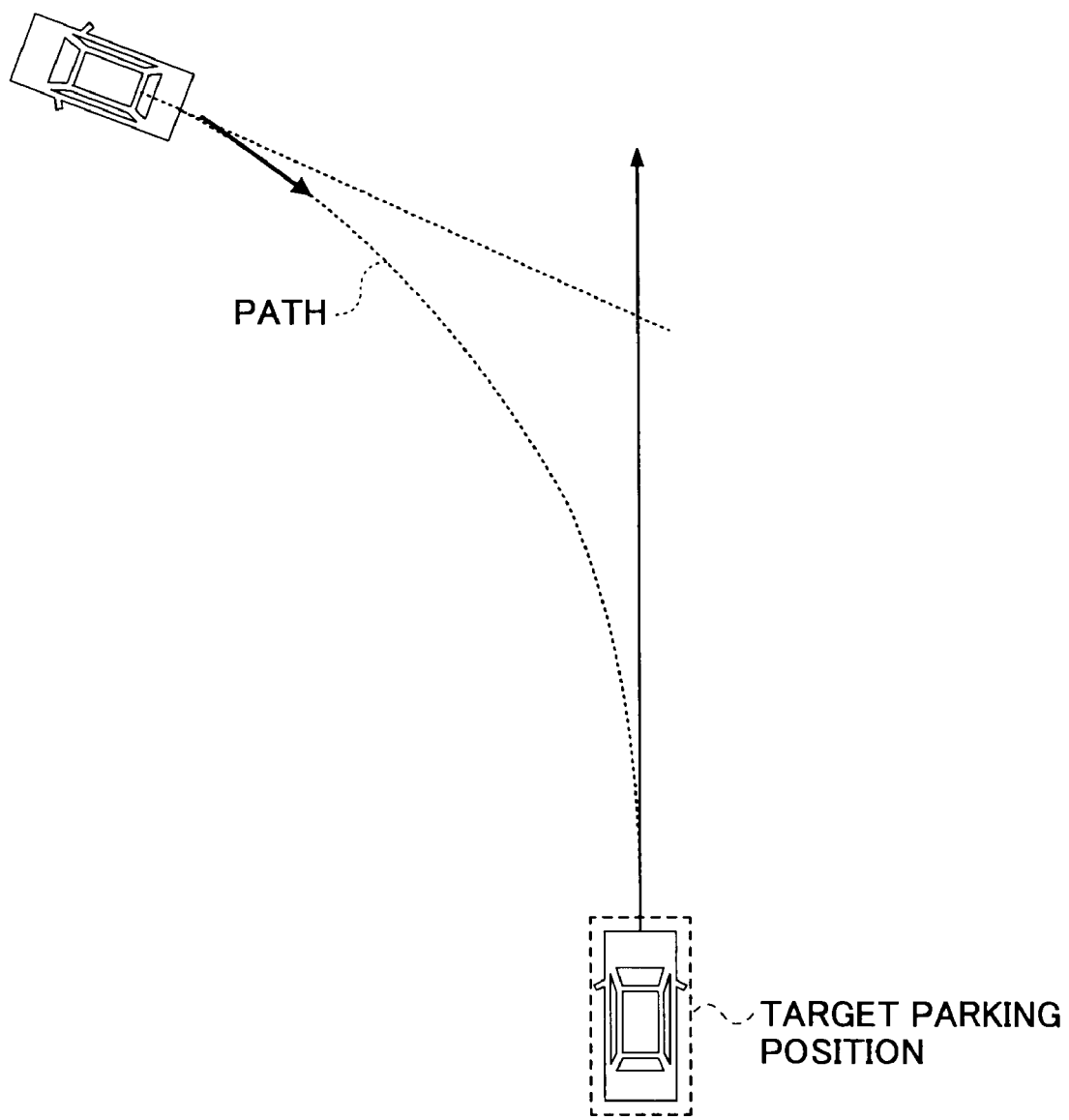
FIG. 12 illustrates a path to the target parking position for parking a vehicle in a parking section.

FIG. 12 illustrates a path to the target parking position for parking a vehicle in a parking section. In the parking section parking mode, the path to the target parking position is calculated as follows. A predetermined geometric positional condition is determined by a relative positional relationship between the minimum turning radius, the present position of the vehicle, and the target parking position. When this predetermined geometric positional condition is satisfied, the path to the target parking position is calculated based on the relative positional relationship in such a manner that the following sections are appropriately formed. That is, (1) a section for proceeding/reversing within a predetermined distance, (2) a section for increasing the rudder angle, (3) a section for fixing the rudder angle, (4) a section for decreasing the rudder angle, and (5) a section for proceeding/reversing within a predetermined distance are formed in this order in the path.

Figure 13:
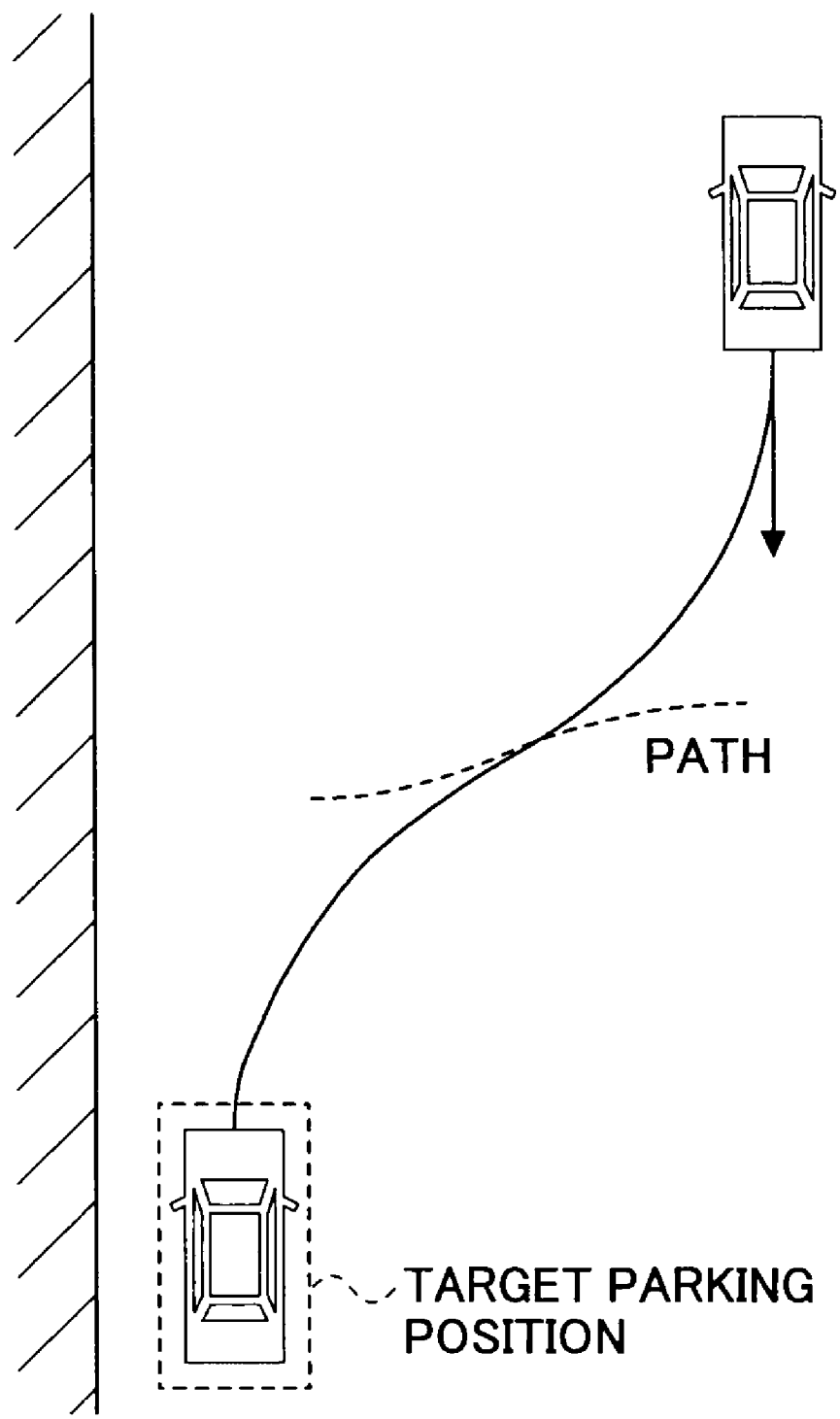
FIG. 13 illustrates a path to the target parking position for parallel-parking a vehicle.

FIG. 13 illustrates a path to the target parking position for parallel-parking a vehicle. In the parallel parking mode, the path to the target parking position is calculated as follows. A predetermined geometric positional condition is determined by a relative positional relationship between the minimum turning radius, the present position of the vehicle, and the target parking position. When this predetermined geometric positional condition is satisfied, the path to the target parking position is calculated based on the relative positional relationship in such a manner as to form a path having two circles tangent to each other.

In the parking section parking mode and in the parallel parking mode, the path to the target parking position is calculated. When the path is generated, the target parking position information and the path information are stored in the memory 120. Additionally, on the display screen of the touch display 116, the target parking frame S is colored green, for example, which indicates that parking assist control can be executed. When the path to the target parking position is generated by the calculation, and the confirm button switch K of the touch display 116 is touched when the target parking frame S is colored green, the arrow button switches C and the confirm button switch K disappear from the touch display 116.

Meanwhile, if the path to the target parking position is not generated by calculation because the relative positions between the vehicle and the target parking position do not satisfy a predetermined relationship, the target parking frame S is colored red, for example, to indicate that the parking assist control cannot be executed. Additionally, to prompt the operator to change the target parking position, the arrow button switches C and the confirm button switch K are continuously displayed. Only the frame of the target parking frame S can be colored, or both the frame and the inside of the target parking frame S can be colored.

When the driver releases the brakes and the vehicle starts to reverse due to a creeping phenomenon where the path to the target parking position is generated and the confirm button switch K on the touch display 116 is touched so that the target parking position is finalized, parking assist control is executed for guiding the vehicle to the target parking position. Specifically, the movement amount of the vehicle on the road after starting to reverse is calculated, and based on this calculated movement amount and the rudder angle information from the EPS 118, the position of the vehicle on the road to the target parking position is calculated. Then, the target rudder angle for moving the vehicle along the generated path is calculated. The calculated target angle is supplied to the EPS 118. Based on the target rudder angle from the parking assist ECU 112, the EPS 118 causes the electric motor to generate torque for rotating the steering shaft to move the vehicle along the generated path.

As described above, at the time of parking section parking and parallel parking, it is possible to execute parking assist control for automatically steering the vehicle along a path to the target parking position set by an operator's operation. If such parking assist control is executed, the driver does not need to steer the vehicle. Accordingly, with the parking support device 110 according to the present embodiment, the driver's workload of steering the vehicle can be reduced at the time of parking section parking and parallel parking.

A preferred embodiment of the present invention is described above; however, the present invention is not limited to the specifically disclosed embodiment, and variations and modifications may be made without departing from the scope of the present invention.

For example, in the second embodiment, the rotation center Q of the target parking frame S is moved to an arbitrary coordinate point, and then the counter clockwise switch or the clockwise switch is used to fine adjust the rotational angle. However, another arbitrary coordinate point can be touched to make the fine adjustment of the rotational angle, without using the counter clockwise switch or the clockwise switch. In this case, a line connecting the rotation center Q and the other arbitrary coordinate point corresponds to one of the four frame lines of the target parking frame. Accordingly, the target parking frame can be set by just touching the display twice, and therefore the vehicle operator's workload is reduced.

The present application is based on Japanese Priority Patent Application No. 2005-316921, filed on Oct. 31, 2005 and Japanese Priority Patent Application No. 2005-317579, filed on Oct. 31, 2005, the entire contents of which are hereby incorporated by reference.

The invention claimed is:

1. A parking support device comprising:
a target parking position setting unit configured to set a target parking position at which a vehicle is to be parked by superimposing a predetermined target parking frame on an actual image displaying an area surrounding the vehicle, wherein
the parking support device guides the vehicle to the target parking position set by the target parking position setting unit,
the target parking position setting unit moves a parking base point position indicated as recognizable by an operator on the target parking frame displayed on a touch display together with the target parking frame, to a coordinate point, the coordinate point being determined by a single touch operation on a part of the touch display other than a button switch.

2. The parking support device according to claim 1, wherein:
the target parking frame has a rectangular shape representing the vehicle; and
one of four corners of the target parking frame is moved to coincide with said coordinate point.

3. The parking support device according to claim 1, further comprising:
a feature point recognition unit configured to recognize a feature point from the actual image displaying the area surrounding the vehicle, wherein:
the target parking position setting unit moves said coordinate point to a feature point, the feature point being located at a different position than the coordinate point and that is recognized by the feature point recognition unit and that is nearest to said coordinate point, and moves the target parking frame to a position indicated by said feature point.

4. The parking support device according to claim 3, wherein:
said feature point comprises a point along a parking section line marked on the ground; and
the target parking position setting unit moves the target parking frame to a position indicated by said point along the parking section line to arrange the target parking frame in such a manner as to substantially correspond to the parking section line.

5. A parking support device comprising:
a target parking position setting unit configured to set, based on a position of a predetermined target parking frame, a target parking position at which a vehicle is to be parked by superimposing the target parking frame on an actual image displaying an area surrounding the vehicle, wherein:
the parking support device guides the vehicle to the target parking position set by the target parking position setting unit; and
the target parking position setting unit moves one of four corners of the target parking frame to a coordinate point determined by a touch operation of a part other than a button switch on a touch display, and uses said coordinate point as a rotation center of the target parking frame so that the target parking frame is adjusted by rotation.

6. The parking support device according to claim 5, wherein:
the target parking frame has a rectangular shape representing the vehicle.

7. The parking support device according to claim 5, further comprising:
a rotation center highlighting unit configured to highlight the rotation center in such a manner that the rotation center can be identified.

8. The parking support device according to claim 5, further comprising:
a translucent display unit configured to display, in a translucent manner, the target parking frame to be superimposed on the actual image displaying the area surrounding the vehicle.

9. The parking support device according to claim 2, further comprising:
a feature point recognition unit configured to recognize a feature point from the actual image displaying the area surrounding the vehicle, wherein:
the target parking position setting unit moves said coordinate point to one feature point that is recognized by the feature point recognition unit and that is nearest to said coordinate point, and moves the target parking frame to a position indicated by said one feature point.

10. The parking support device according to claim 6, further comprising:
a rotation center highlighting unit configured to highlight the rotation center in such a manner that the rotation center can be identified.

11. The parking support device according to claim 5, wherein the target parking position setting unit moves the target parking frame initially displayed on a touch display, to the position indicated by the coordinate point based on a single touch operation that indicates the position of the coordinate point.

12. A parking support device comprising:

a target parking position setting unit configured to set a target parking position at which a vehicle is to be parked by superimposing a predetermined target parking frame on an actual image displaying an area surrounding the vehicle, wherein the parking support device guides the vehicle to the target parking position set by the target parking position setting unit, wherein the target parking frame includes a parking base point overlapping on the display at least a portion of the target parking frame, wherein a user's single touch operation on the display other than a button switch indicates a position of one coordinate point, wherein the target parking position setting unit moves the target parking frame to a position indicated by the one coordinate point based on the touch operation of the user, and wherein the setting unit moves the target parking frame such that the parking base point substantially overlaps the one coordinate point.

13. The parking support device according to claim 12, further comprising:

a feature point recognition unit configured to recognize a feature point from the actual image displaying the area surrounding the vehicle, wherein the target parking position setting unit moves said one coordinate point to one feature point that is recognized by the feature point recognition unit and that is nearest to said one coordinate point, and moves the target parking frame to a position indicated by said one feature point such that the parking base point substantially overlaps the one coordinate point.

* * * * *